(12) United States Patent  
Ikiades et al.

(10) Patent No.: US 7,586,419 B2
(45) Date of Patent: Sep. 8, 2009

(54) ICE DETECTION APPARATUS AND METHOD

(75) Inventors: Aristedis Anthony Ikiades, Crete (GR); David John Armstrong, Luton (GB); George Graham Hare, Luton (GB); Mary Konstantaki, Crete (GR)

(73) Assignee: GKN Aerospace Services Limited, East Cowes, Isle of Wight (GB)

( * ) Notice: Subject to any disclaimer, the term of this patent is extended or adjusted under 35 U.S.C. 154(b) by 37 days.

(21) Appl. No.: 10/560,755

(22) PCT Filed: Jun. 17, 2003 (Under 37 CFR 1.47)

(86) PCT No.: PCT/GB03/02600
§ 371 (c)(1), (2), (4) Date: Sep. 11, 2006

(87) PCT Pub. No.: WO2004/110865
PCT Pub. Date: Dec. 23, 2004

(65) Prior Publication Data
US 2007/0080789 A1    Apr. 12, 2007

(30) Foreign Application Priority Data
Jun. 13, 2003    (GB) ................. PCT/GB03/02539

(51) Int. Cl.
G08B 19/02    (2006.01)
G01W 1/00    (2006.01)
G08B 21/00    (2006.01)
G01R 27/26    (2006.01)

(52) U.S. Cl. ............. 340/580; 340/581; 340/601; 340/962; 324/671; 73/170.26

(58) Field of Classification Search ........... 340/583, 340/580, 581, 962, 601; 324/671; 73/170.26
See application file for complete search history.

(56) References Cited

U.S. PATENT DOCUMENTS

| 3,940,622 | A | * | 2/1976 | Stallabrass et al. ....... 250/338.1 |
| 5,313,202 | A | * | 5/1994 | Hansman et al. ........... 340/962 |
| 5,398,547 | A | * | 3/1995 | Gerardi et al. ............ 73/170.26 |
| 5,474,261 | A | * | 12/1995 | Stolarczyk et al. ........ 244/134 F |
| 5,484,121 | A |   | 1/1996 | Padawer et al. |
| 5,596,320 | A | * | 1/1997 | Barnes ..................... 340/962 |
| 5,748,091 | A | * | 5/1998 | Kim .......................... 340/583 |
| 5,760,711 | A | * | 6/1998 | Burns ....................... 340/962 |
| 6,049,282 | A |   | 4/2000 | Mackenzie |

FOREIGN PATENT DOCUMENTS

| DE | 3506317 | 2/1986 |
| GB | 2158939 | 11/1985 |

OTHER PUBLICATIONS

International Search Report for PCT Application No. PC/GB2003/002600.

* cited by examiner

*Primary Examiner*—Daniel Wu
*Assistant Examiner*—Jack Wang
(74) *Attorney, Agent, or Firm*—Quarles & Brady LLP

(57) ABSTRACT

Ice detection apparatus for monitoring ice accretion on aircraft surfaces, comprising an array of optical fibres which are mounted flush with an outer surface of an aircraft skin, and an intermediately located electromagnetic radiation emitter which is provided by an optical fibre. In use radiation is emitted by the emitter generally outwardly of the aircraft surface, and the layer of accreted ice diffuses the emitted radiation scattered and reflected. The diffused radiation is detected by the sensors, and the spatial distribution of the detected intensity diffused radiation about the emitter can be used to calculate the thickness of the layer of ice and the type of ice.

24 Claims, 10 Drawing Sheets

| Comp1 | Comp2 | Comp3 | O/P |
|-------|-------|-------|-----|
| 0 | 0 | 0 | 00 |
| 1 | 0 | 0 | 01 |
| 1 | 1 | 0 | 10 |
| 1 | 1 | 1 | 11 |

*Fig. 13*

ICE DETECTION APPARATUS AND METHOD

The present application is a U.S. national stage application of International Application No. PCT/GB2003/002600, filed Jun. 17, 2003, which claims priority to International Application No. PCT/GB2003/002539, filed Jun. 13, 2003.

The present invention relates to apparatus and methods for detecting and monitoring ice accretion, and in particular, but not exclusively, on aircraft surfaces.

Ice accretion on flying surfaces affects the aerodynamic performance and handling qualities of an aircraft, and may require different pilot corrective action, dependent upon the surface that ice is accreting onto. Current methodology for ice detection usually relies on an indirect method, normally based on ambient air temperature, and liquid water content. When a pre-set threshold level is reached, the ice protection system is activated, whether or not ice is accreting on critical surfaces. This method is not cost effective or efficient for an ice protection system.

Known ice sensor arrangements are capable of detecting the presence, and with some the thickness, of ice, however they all offer challenges for integration into a distributive network. Furthermore the known ice sensor arrangements do not give an indication of the type (or roughness) of ice accretion, which has a marked influence on the aerodynamic performance of an aircraft.

The present invention seeks to provide an alternative ice detection apparatus and method.

According to a first aspect of the invention there is provided apparatus for detecting ice accretion comprising an electromagnetic radiation emitter and an array of sensors, the emitter being located intermediate of the array of sensors and at least some of the sensors being located at different distances from the emitter.

Most preferably the sensors are substantially symmetrical about the emitter.

Preferably the sensor array comprises first and second sets of sensors which are arranged in generally opposing respective paths away from the emitter.

Preferably the sets of sensors are arranged in respective straight lines. Alternatively the sets of sensors may be arranged to follow respective curvilinear paths which may be (mirror) symmetrical about the emitter.

The apparatus may comprise third and fourth sets of sensors which are arranged to follow (generally opposing) respective paths generally away from the emitter. Preferably the first and second sets of sensors, and the third and fourth sets of sensors together form a substantially cruciform arrangement of sensors about the emitter.

The array of sensors may be asymmetrical about the emitter.

The emitter need not necessarily be located at the geometrical centre of the array of sensors.

According to a second aspect of the invention there is provided a method of monitoring ice accretion comprising emitting an electromagnetic radiation signal from an emitter, detecting diffused radiation which comprises radiation scattered and/or reflected by a layer of accreted ice, detection of the diffused radiation being effected by an array of sensors, at least some of the sensors being at different distances from the emitter, and the method further comprising comparing detected intensity of the diffused radiation at a particular distance from the emitter a respective predetermined value so as to determine the type of accreted ice.

Preferably the method comprises determining the thickness of ice which has accreted on an aircraft surface.

Preferably the method comprises determining the type of ice which has accreted on an aircraft surface.

The method desirably comprises comparing the detected spatial distribution of intensity of the diffused radiation to stored data representative of the spatial distribution of intensity of the diffused radiation in the ice for different ice types.

According to a third aspect of the invention there is provided data processing equipment for ice detection apparatus comprising comparator means, the comparator means, in use, receiving signals representative of the intensity of diffused radiation which comprises radiation scattered and/or reflected by a layer of accreted ice, which diffused radiation is detected by an array of sensors, at least some of the sensors being located at different distances from an electromagnetic radiation emitter, the comparator means being configured to compare detected intensity of the diffused radiation to a predetermined value and determine whether said value detected intensity is above the predetermined value so as to enable the data processing equipment to determine the type of accreted ice.

Various embodiments of the invention will now be described, by way of example only, with reference to the accompanying drawings, in which.

Figure 1:
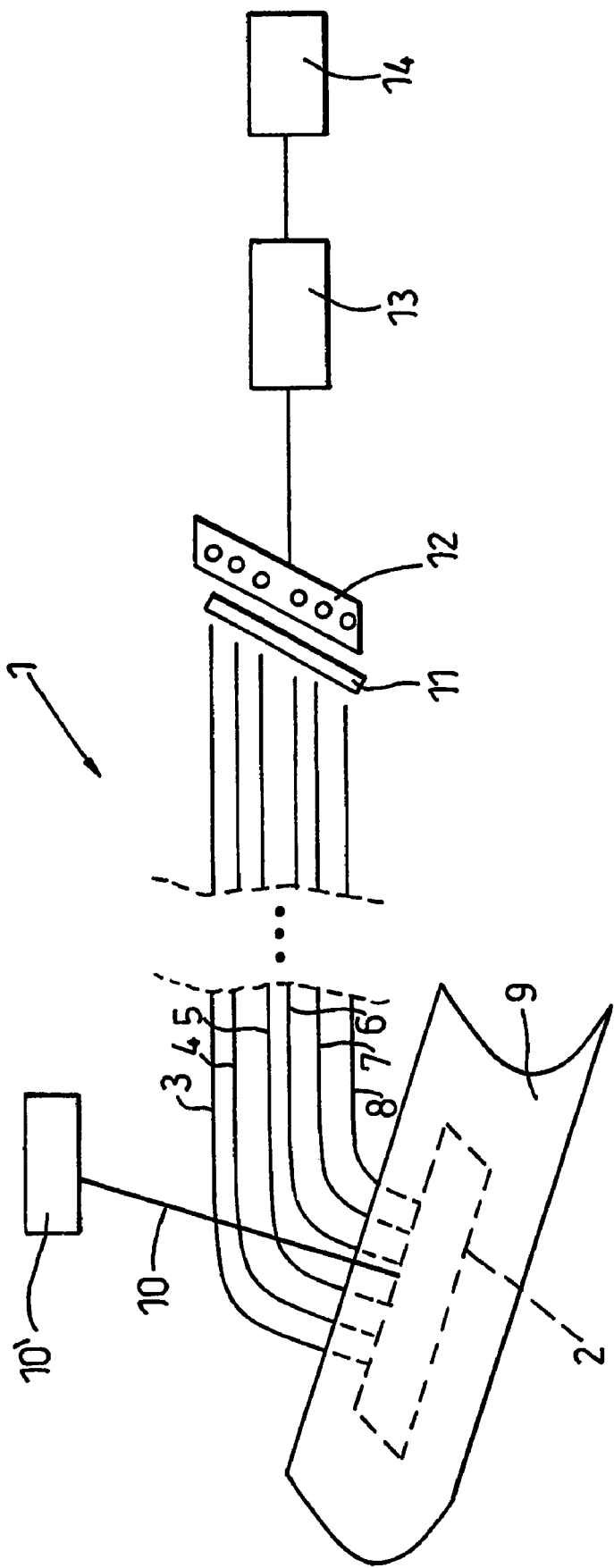
FIG. 1 is a schematic representation of an ice detection apparatus for an aircraft.
Figure 11:
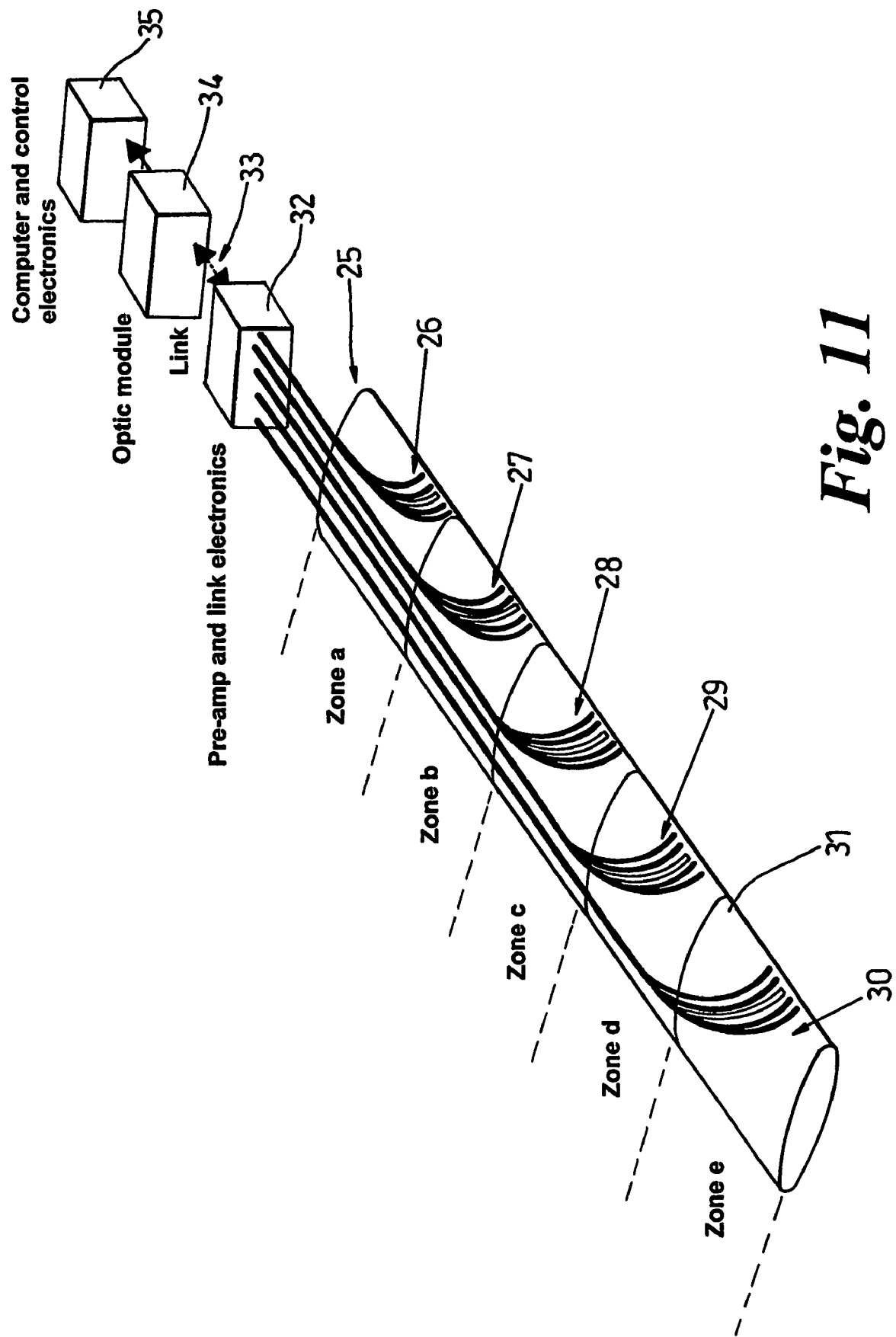
Figure 12:
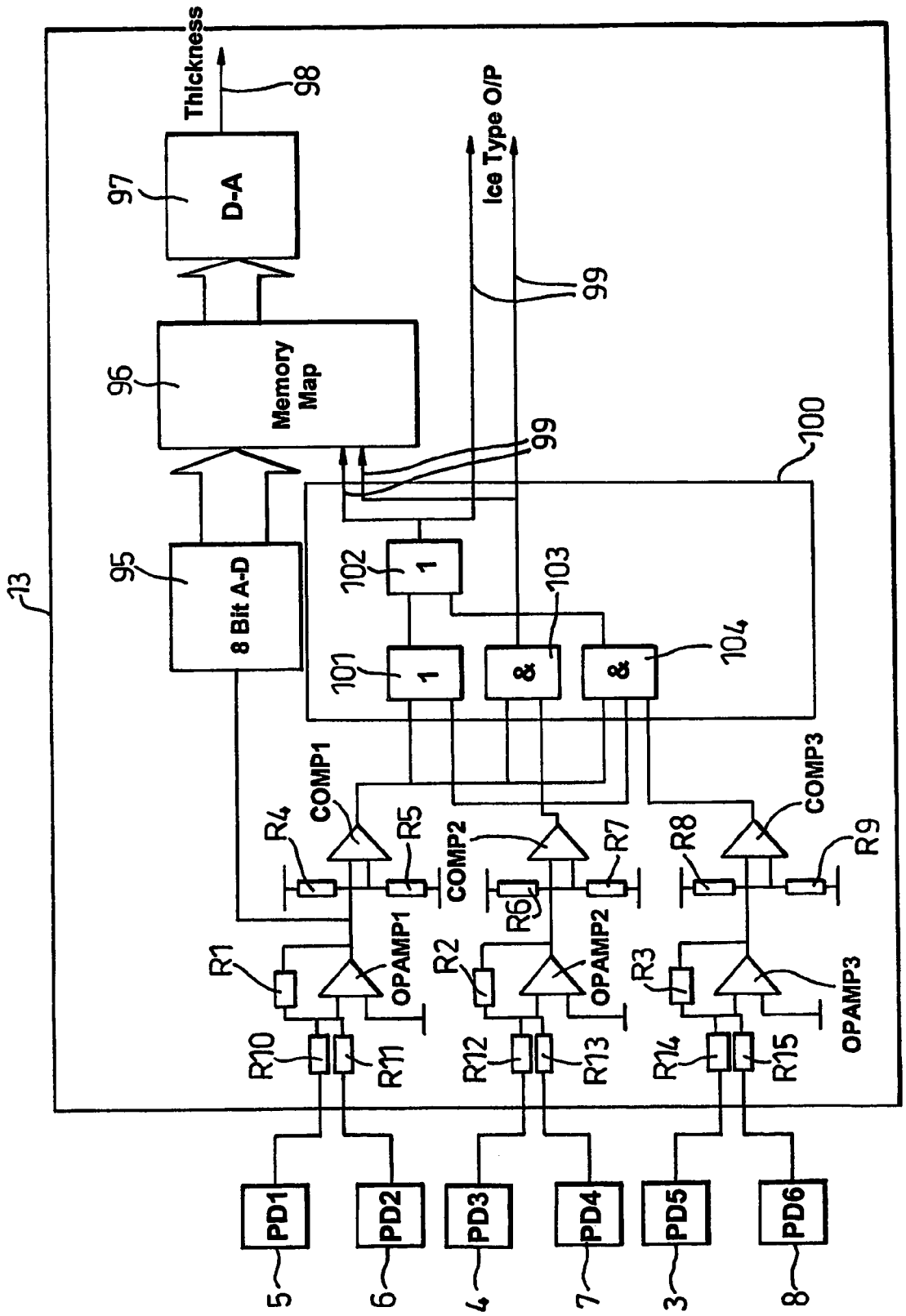
Figure 14:
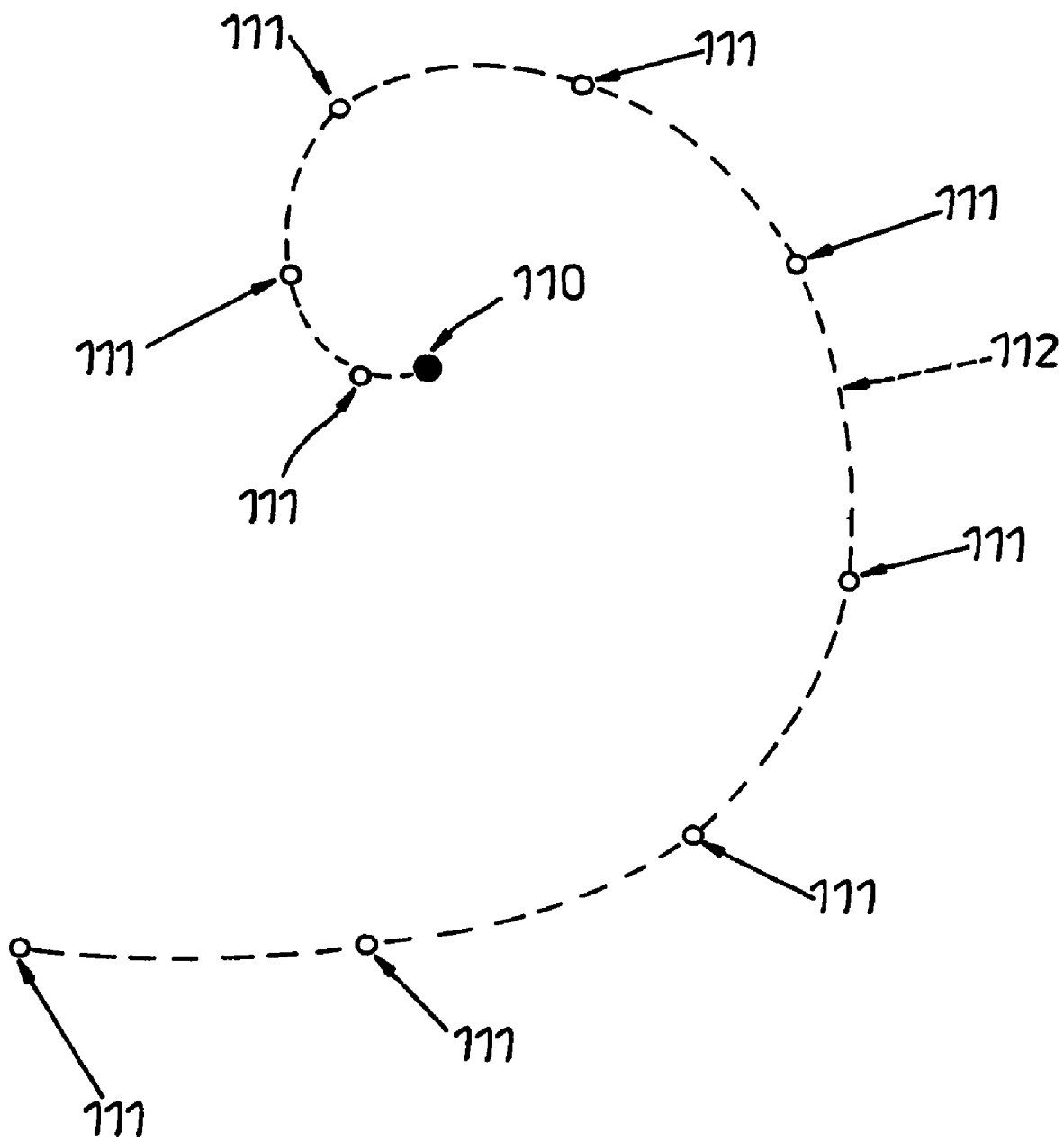

FIG. 11 is a schematic perspective view of a rotorcraft blade and associated equipment, the blade being provided with multiple emitter and sensor arrangements, FIG. 12 is a schematic representation of the electronic components of the data acquisition unit of the ice detection apparatus of FIG. 1, FIG. 13 is a truth table showing how the possible various outputs of the comparators correspond to different ice types, and FIG. 14 is an alternative emitter/sensor configuration.

With reference to FIG. 1 there is shown an apparatus 1 for monitoring ice accretion on an aerofoil 9, which apparatus comprises a light emitter 10, and sensors 3, 4, 5, 6, 7 and 8.

Figure 3:
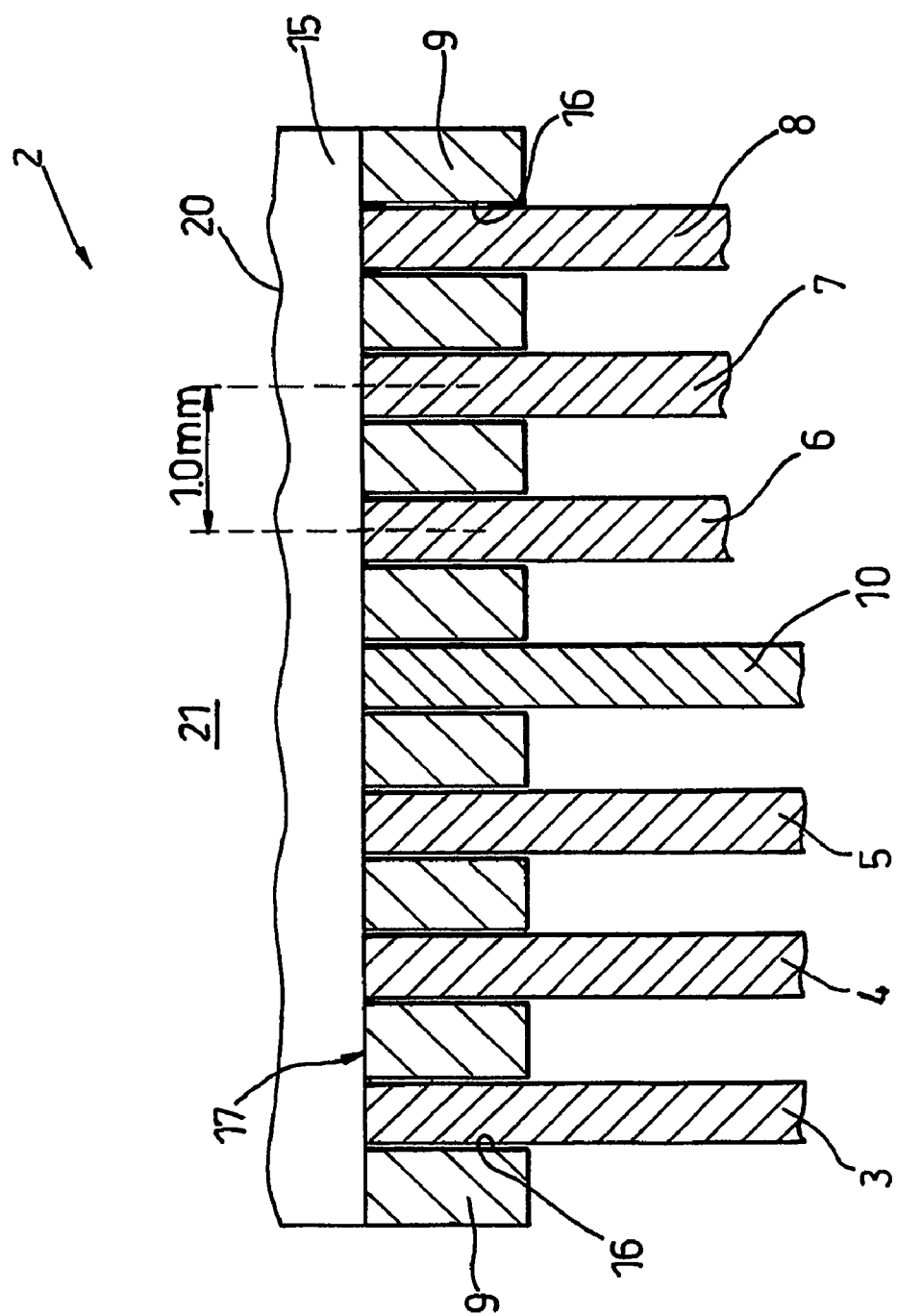
FIG. 3 is a cross-sectional view of aircraft surface which is provided with flush mounted fibre optic cables.
Figure 4:
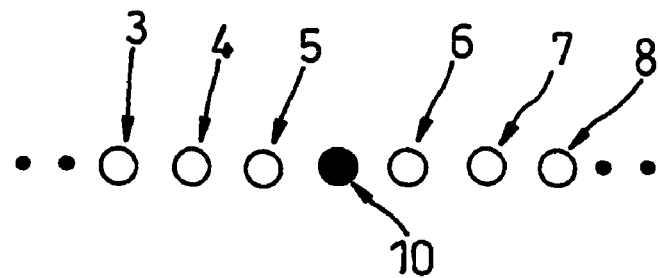
FIG. 4 is a schematic plan view of an array of sensors disposed diametrically about a central emitter.

As is seen from FIG. 3, the ice monitoring region 2 of the aerofoil 9 comprises the emitter 10 which comprises central fibre optic cable, and six sensors 3, 4, 5, 6, 7 and 8 which are provided by single mode fibre optic cables disposed diametrically about the emitter 10. The emitter 10 and the sensors 3, 4, 5, 6, 7 and 8 are accommodated in respective holes 16 which have been drilled into the aerofoil 9. The emitter and sensors are flush mounted (ie air conformal) with the outer surface 17 of the aerofoil 9. The distance between the longitudinal axes of adjacent sensors, and between the longitudinal axis of the emitter 10 and the longitudinal axes of the sensors 5 and 6 is 1 mm. The emitter 10 is connected to a radiation source 10'.

The apparatus 1 further comprises ambient light filters 11 which receive optical signals from the sensors 3, 4, 5, 6, 7 and 8. The signals from the filters are then received by a diode array 12 which converts the optical signals into electrical signals. The output of the diode array 12 is then fed into a data acquisition unit 13 and the output from the data acquisition unit 13 to a control unit 14.

The data acquisition unit 13 is configured to determine ice thickness and type, and to better understand the structure of this unit some explanation of various types of ice is now given.

Glaze/Clear ice, as it name suggests, is optically clear and very little light is scattered.

Rime ice is optically opaque and air is trapped in volume of the ice resulting in micro-scattering centres. Accordingly rime ice scatters light much further from a source than clear ice.

Mixed phase ice, as its name suggests if anything in between, to the amount of scattering of light is dependent upon the content of glaze and rime ice.

In the case of rime ice growth, and for small thickness of ice, the dominant contributions to the optical signal detected by the fibres are due to light scattered from air trapped in the ice layer, giving rise to a rapidly increasing signal with ice thickness. However, as the ice thickness increases, and the ice-air interface recedes away from the fibres the optical contribution of light scattered from the ice-air interface also decreases and scattering from the main ice volume becomes more significant. This results in a slower rate of increase in intensity with ice thickness. In rime ice all fibres, on both sides of the light source, exhibit similar behaviour but at reduced signal strength (with increasing distance away from the light source) due to the regular optical diffusion.

In the case of glazed or clear ice, which is transparent and has a very irregular structure due to the aerodynamics of the aerofoil, with pointed ice-air interfaces and micro-cracks, light is randomly reflected or scattered therefrom. Consequently for small ice thickness, the dominant contribution to the optical signal detected by the fibres, is due to the random reflections and scattering from the volume and surface irregularities. However as the ice thickness increases the surface irregularities can potentially contribute to the optical signal, as the ice is mostly transparent, but these contributions are random, and scattering from the ice volume micro-cracks dominate. The characteristic optical signature, detected by the fibre optics during the ice growth of this type of ice, exhibits a general increase of the optical signal with ice thickness with large fluctuations related to the random scattering at the ice air interfaces.

Figure 7:
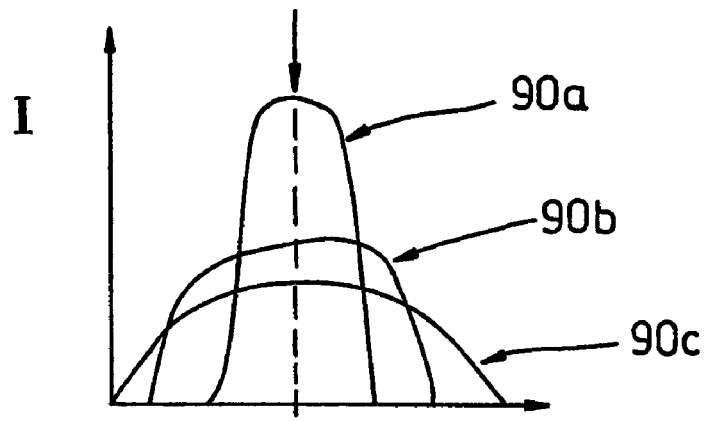
FIG. 7 shows curves of intensity against sensor position for different ice types.

FIG. 7 shows three curves 90$a$, 90$b$, 90$c$ of detected intensity against sensor position. The curve 90$a$ represents the 'spatial signature' of glazed or clear ice, the curve 90$b$ represents the 'spatial signature' of mixed phase ice, and the curve 90$c$ represents the 'spatial signature' of rime ice.

Figure 8:
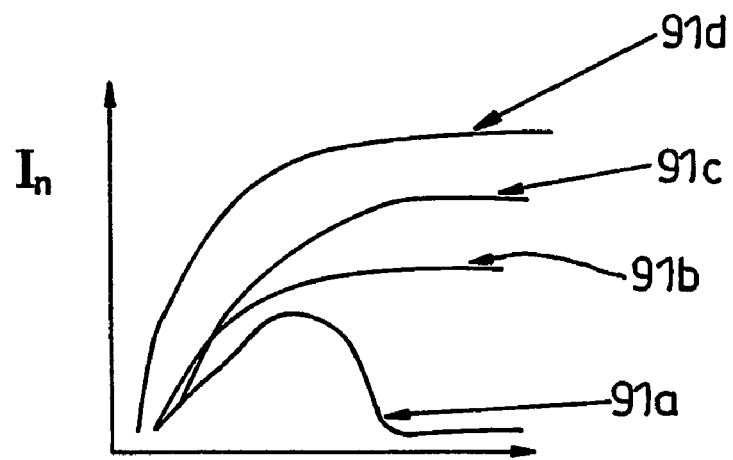
FIG. 8 shows curves of intensity against ice thickness for different ice types.

Referring to FIG. 8 there is shown a family of curves 91$a$, 91$b$, 91$c$ and 91$d$ of the average detected intensity (measured at a particular distance from the emitter) against ice thickness. The curve 91$d$ is representative of rime ice, and the curve 91$a$ is representative of glazed or clear ice. The curves 91$b$ and 91$c$ are representative of mixed phase ice types, with the curve 91$c$ representing ice having a greater rime ice content than the ice which is represented by curve 91$b$.

The data acquisition unit 13 is shown in more detail in FIG. 12. The unit 13 comprises three comparators COMP1, COMP2 and COMP3, a logic array 100, an analogue to digital converter 95, a memory map 96 and a digital to analogue converter 97

One input of each of the comparators COMP1, COMP2 and COMP3 is connected to the outputs of operational amplifiers OPAMP1, OPAMP2 and OPAMP3 respectively. The operational amplifiers OPAMP1, OPAMP2 and OPAMP3 are provided with feedback resistors R1, R2 and R3 respectively, and input resistors R10 and R11, R12 and R13, and R14 and R15 respectively. The input resistors are connected to the photodiodes PD1, PD2, PD4, PD5 and PD6, which receive signals from the respective optical fibres of each of the sensors 5, 6, 4, 7, 3 and 8 respectively. Operational amplifier OPAMP1 receives input from PD1 and PD2, operational amplifier OPAMP2 receives input from PD3 and PD4, and operational amplifier OPAMP3 receives input from PD5 and PD6.

Outputs of the comparators COMP1, COMP2 and COMP3 are connected to a logic array 100 which comprises two exclusive-OR gates 101 and 102 and two AND gates 103 and 104.

The eight bit analogue to digital converter 95 receives an input from OPAMP1 and the output of the converter 95 is connected to the memory map 96, as is the output of the logic array 100. The memory map 96 has stored therein look-up tables representative of detected intensity values and corresponding ice thickness values for various ice types as detected by sensors 5 and 6 (ie those sensors closest to the emitter 10). These values in the look-up tables are based on the various curves shown in FIG. 8.

The output of the memory map 96 is input into a digital to analogue converter 97 which produces an output 98.

Figure 2:
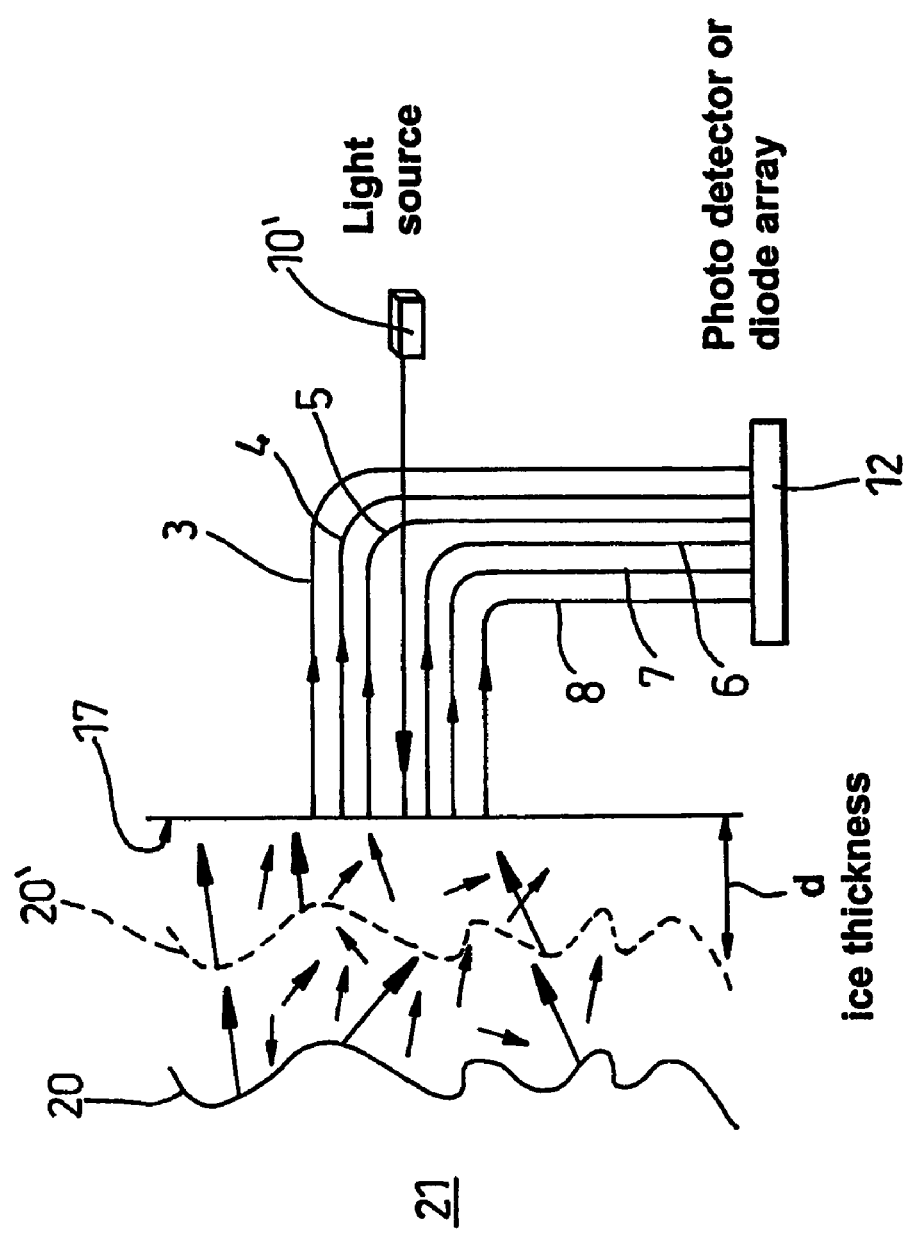
FIG. 2 is a schematic representation of part of the ice detection apparatus of FIG. 1 which shows reflected and scattered light from an accreted layer of ice.

In use the apparatus 1 operates as follows. Radiation in the wavelength range 500 nm to 1300 nm is generated by light source 11 and emitted from the distal end of the emitter 10 which is arranged to be substantially flush with the outer surface 17 of the aerofoil 9. The light issuing from the emitter 10 is directed generally outwardly of the outer surface 17. As best seen in FIG. 2 light enters a layer 15 of accreted ice on the aerofoil 9, some of the light is reflected back towards the aerofoil at the boundary 20 between the accreted ice and the air 21. Some of the emitted light is scattered by the ice layer 15 back towards the aerofoil 9. That diffused radiation comprising the reflected and scattered light is received by the flush-mounted distal ends of the sensors 3, 4, 5, 6, 7 and 8.

The signals from the photodiodes PD1, PD2, PD3, PD4, PD5 and PD6 are amplified by operational amplifiers OPAMP1, OPAMP2 and OPAMP3, the outputs of which are input to the respective comparators. As can be seen from FIG. 12, one input of each comparator COMP1, COMP2 and COMP3 is held at a threshold voltage. In particular one input of COMP1 is held at a threshold voltage determined by R4 and R5, one input of COMP2 is held at a threshold voltage by R6 and R7, and one input of COMP3 is held at a voltage determined by R8 and R9. The respective threshold voltages are determined in accordance with the data from FIG. 7. If an (amplified) signal from connected photodiodes exceeds the threshold voltage then the comparator outputs a '1', otherwise the comparator issues an '0'. The outputs of the comparators are input into the logic array 100, the logic array being configured to implement the truth table shown in FIG. 13. Thus a two-bit output 99 results which is indicative of the type of the accreted ice layer. In the truth table:

| | |
|---|---|
| 00 | No ice |
| 01 | glaze/clear ice |
| 10 | mixed phase ice |
| 11 | rime ice |

As is evident if comparators COMP3 and/or COMP2 output a '1' this indicates wider scattering.

The thickness of the accreted ice layer 15 is determined in the following way. Returning to FIG. 12, it can be seen that the output of OPAMP1 is fed to the analogue to digital converter 95. This signal provides a non-linear measurement of ice thickness. Since ice type has been determined, and is given by output 99, the appropriate look-up table stored in memory map 96 can be selected. It is then a straightforward operation to locate in the appropriate look-up table the detected intensity value input by the converter 95 and read the corresponding ice thickness value. The converter 97 then converts that value into an analogue signal 98.

Signals from the data acquisition unit 13 are then fed to the control unit 14. The control unit uses the signals from the data acquisition unit 13 to apply power to the aircraft ice protection system (IPS).

The way the IPS is configured will be dependent upon the application of the sensors. With a single sensor system, the control unit will apply an algorithm to determine the required de-icing sequence given the current conditions. A multi-sensor system on the other hand has the capability to apply the de-icing sequence dependent upon the specific ice build up at that point on the airframe/airfoil.

A further simplified use of the apparatus 1 would be to provide an 'ice/no ice' indication. This would be useful to the pilots of smaller general aviation aircraft without ice protection systems fitted, to allow for easier identification of wing or tail stall due to ice accretion.

With reference to FIG. 11 there is shown a helicopter blade 25 which is provided emitter/sensor configurations 26, 27, 28, 29 and 30 which are arranged to monitor ice accretion along the length of leading edge 31 of the blade 25.

Each emitter/sensor configuration comprises a central emitter (unreferenced) in the form of a fibre optic cable which interposes two diametrically opposed sensors (unreferenced) also provided by fibre optic cables. Each emitter/sensor configuration is arranged to monitor a respective zone of the blade 25. The fibre optic cables, which would typically be embedded in the blade, are arranged to lead to the inboard end of the blade 25 to pre-amp and link electronics 32. A link 33 comprises an optical slip ring which allows the sensed data to pass from the rotating blade 25 to the frame of the aircraft. The aircraft then houses an optic module 34 and computer and control electronics 35.

This 'distributive architecture' opens up the possibility for multiple ice protection technologies to be used on the same aircraft in different areas.

There are numerous other ways in which the invention could be embodied. In one preferred embodiment the emitter and sensors are provided as an integral unit in the form of an emitter/sensor head which may be installed into an aircraft by making a suitably sized recess therein. Signals would be sent back to remotely located data processing equipment.

Figure 9:
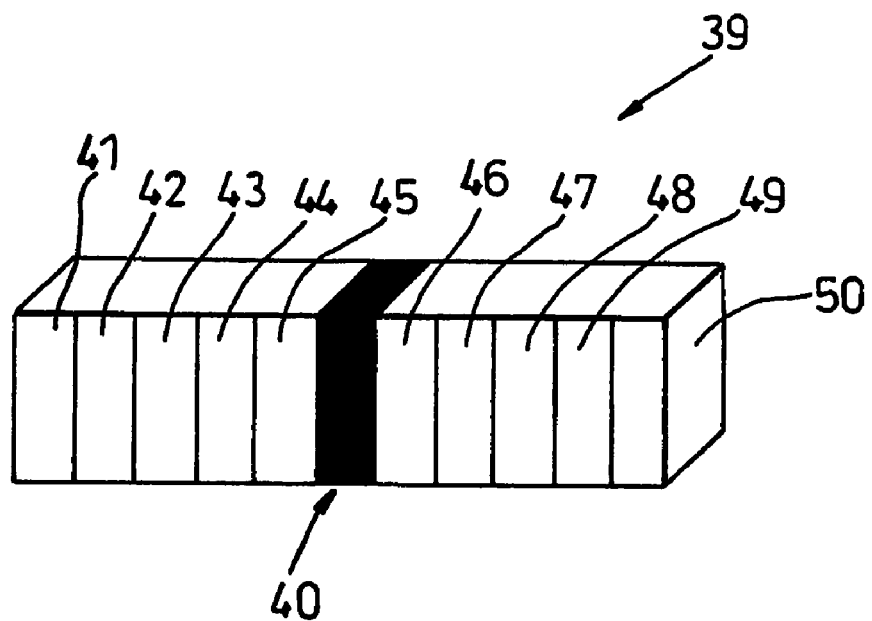
FIG. 9 is a schematic perspective view of a diode emitter and sensor head.
Figure 10:
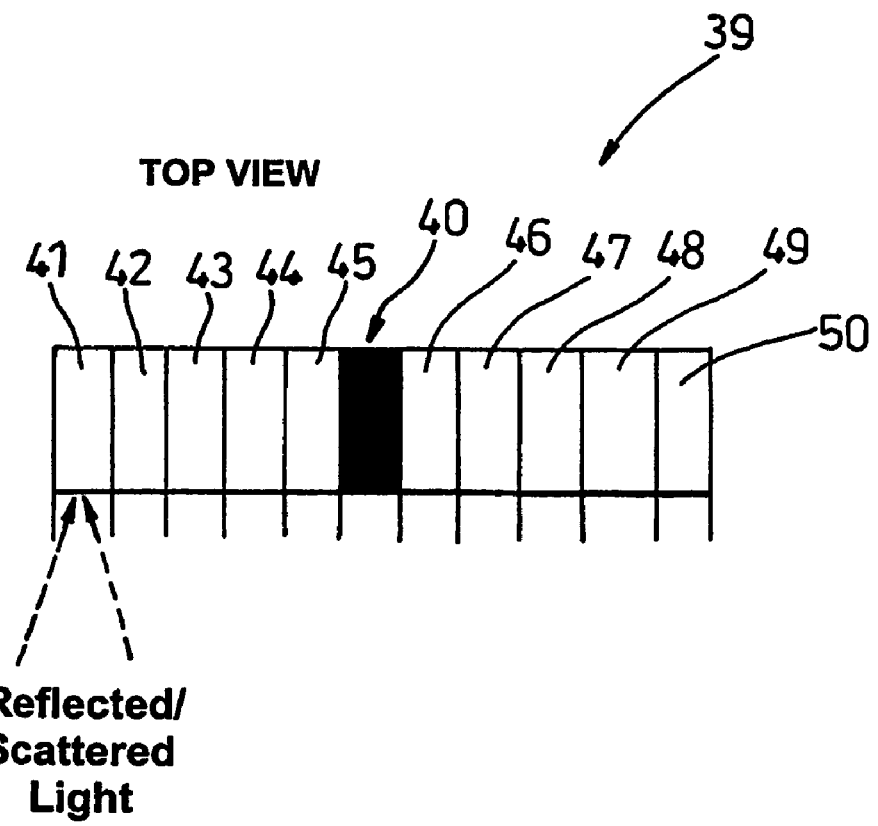
FIG. 10 is a plan view of the diode emitter and sensor head shown in FIG. 9.

In yet a further embodiment shown schematically in FIGS. 9 and 10, an emitter/sensor head may comprise an array of photodiodes (which serve as sensors) 41 to 50 and a central light emitting diode 40.

Figure 5:
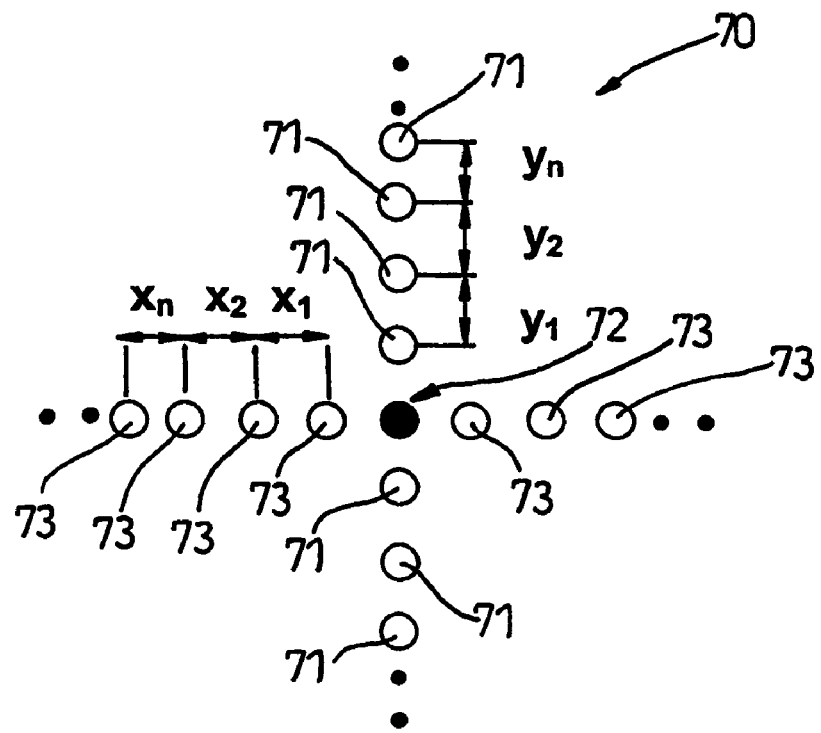
FIG. 5 is a schematic plan view of a second array of sensors which are arranged in a cruciform about a central emitter.

With reference to FIG. 5 there is shown an alternative emitter/sensor arrangement 70 wherein fibre optic cables 73 are arranged in two sets of sensors, one on each side of a light emitting fibre optic cable 72, and fibre optical cables 71 are arranged in two similar sets about cable 72, but at substantially 90° relative thereto. It will be appreciated that the centre spacings between adjacent cables 71 and adjacent cables 73 need not necessarily be the same, so $x_1 = $ or $\neq x_2 = $ or $\neq x_n$, and $y_1 = $ or $\neq y_2 = $ or $\neq y_n$ This cruciform arrangement not only increases the detection area, but also provides a degree of redundancy in the arrangement.

Figure 6:
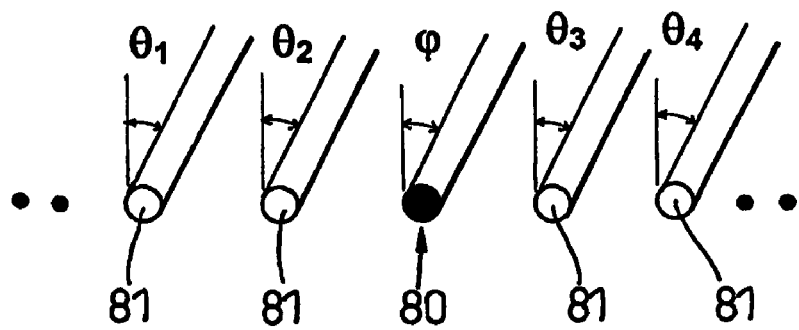
FIG. 6 shows a schematic plan view of a third array of sensors which are arranged at various angles to the skin of an aircraft.

FIG. 6 illustrates that emitter and/or sensor cables 80 and 81 need not necessarily extend substantially perpendicular to the outer surface of the aircraft, and moreover, $\theta_1 = $ or $\neq \theta_n$ or $\neq \emptyset$.

The spacing between the centres of adjacent optical fibres could typically be in the range 40 μm to 5 mm, for example.

FIG. 14 shows an alternative emitter/sensor configuration which comprises an emitter 110 and a plurality of sensors 111. The sensors 111 are arranged in a substantially spiral path (shown by broken line 112) around the intermediately located emitter 110, and accordingly the sensors are located at progressively greater distances from the emitter 110.

In an alternative embodiment the output of the comparator COMP3 is used as an ice type indication and is connected directly to the control unit 14. As is evident if the output of the comparator COMP3 issues a '1' rime ice is present. If, however, a '0' is issued one of either no ice, clear/glazed ice or mixed phase ice is present. Although such an embodiment is less informative than the embodiment of FIG. 12, it may nevertheless find utility in particular applications.

In yet a further embodiment modified comparator means is configured to issue a '1' if the respective input signals representative of detected intensities of diffused radiation are within respective particular predetermined ranges of values, otherwise a '0' is issued.

The invention of claimed is:

1. An apparatus for detecting ice accretion comprising: an electromagnetic radiation emitter and a corresponding array of sensors that is closer to the emitter than any other emitter, the emitter being located intermediate of the corresponding array of sensors and at least some of the sensors being located at different distances from the emitter; and a comparator configured to compare a detected intensity of the diffused radiation to a predetermined value and to determine whether the detected intensity is above the predetermined value such that a data processing equipment determines the type of accreted ice.

2. The apparatus as claimed in claim 1 in which the sensors are substantially symmetrical about the emitter.

3. The apparatus as claimed in claim 1 in which the array of sensors comprises a first set of sensors and a second set of sensors, the first and second sets of sensors being arranged to follow respective paths generally away from the emitter.

4. The apparatus as claimed in claim 3 in which the sets of sensors are arranged in respective radial paths.

5. The apparatus as claimed in claim 3 in which the array of sensors further comprises third and fourth sets of sensors, the first, second, third and fourth sets of sensors together forming a substantially cruciform arrangement of sensors about the emitter.

6. The apparatus as claimed in claim 1 in which the array of sensors is substantially flush with a surface in which the array is mounted.

7. The apparatus as claimed in claim 1 which is an apparatus for detecting ice accretion on an aircraft surface.

8. A method of monitoring ice accretion comprising emitting an electromagnetic radiation signal from an emitter, detecting diffused radiation which comprises radiation which is scattered and/or reflected by a layer of accreted ice, detection of the diffused radiation being effected by a corresponding array of sensors that is closer to the emitter than any other emitter, at least some of the sensors being at different distances from the emitter, and the method further comprising comparing detected intensity of the diffused radiation at a particular distance from the emitter to a respective predetermined value so as to determine the type of accreted ice.

9. The method as claimed in claim 8 which comprises comparing the detected intensity of the diffused radiation at different distances from the emitter to respective predetermined values so as to determine the type of accreted ice.

10. The method as claimed in claim 9 which comprises determining whether the detected intensity of diffused radiation at a particular distance from the emitter is above a predetermined threshold value.

11. The method as claimed in claim 9 which comprises determining the type of accreted ice in response to which sensors at different distances from the emitter detect scattered and/or reflected intensity of diffused radiation above respective predetermined threshold values.

12. The method as claimed in claim 8 which comprises selecting a look-up table of detected intensity values of diffused radiation and ice thickness values in response to the determined ice type.

13. The method as claimed in claim 12 which comprises determining ice thickness by locating a value of ice thickness in the respective look-up table which corresponds to a detected intensity of diffused radiation at a particular distance from the emitter.

14. The method as claimed in claim 13 which comprises using the value of detected intensity of diffused radiation which corresponds to a sensor position which is closest to the emitter to determine the ice thickness from the look-up table.

15. A data processing equipment for ice detection apparatus comprising comparator means, the comparator means, in use, receiving signals representative of the intensity of diffused radiation which comprises radiation scattered and/or reflected by a layer of accreted ice, which diffused radiation is detected by an array of sensors, at least some of the sensors being located at different distances from a corresponding electromagnetic radiation emitter that is closer to the array of sensors than any other emitter, the comparator means being configured to compare detected intensity of the diffused radiation to a predetermined value and determine whether said value of detected intensity of the diffused radiation is above the predetermined value so as to enable the data processing equipment to determine the type of accreted ice.

16. The data processing equipment as claimed in claim 15 in which the comparator means is configured to compare the detected intensity of the diffused radiation to predetermined values and determine whether said values of detected intensity of the diffused radiation are above the predetermined values so as to enable the data processing equipment to determine the type of accreted ice.

17. The data processing equipment as claimed in claim 16 in which the comparator means is configured to compare detected intensity of diffused radiation at different distances from the emitter to respective predetermined values.

18. The data processing equipment as claimed in claim 17 in which the comparator means comprises multiple comparators, each comparator being input with a signal which is representative of a detected intensity of diffused radiation at a respective distance from the emitter.

19. The data processing equipment as claimed in claim 18 in which each comparator is configured to compare a received detected intensity of diffused radiation to a respective threshold value.

20. The data processing equipment as claimed in claim 19 in which outputs of the comparators are indicative of the type of the accreted ice.

21. The data processing equipment as claimed in claim 20 in which the outputs of the comparators are input into a logic array, the logic array being configured to output a binary number which is indicative of the type of the accreted ice.

22. The data processing equipment as claimed in claim 15 which comprises a memory which stores look-up tables of detected intensity values of diffused radiation and corresponding ice thickness values for different ice types.

23. The data processing equipment as claimed in claim 22 which is configured to select the look-up table in response to the determined ice type.

24. The data processing equipment as claimed in claim 22 which is configured to determine ice thickness by locating an ice thickness value in the look-up table which corresponds to a detected intensity of diffused radiation.

\* \* \* \* \*